March 24, 1931. A. T. POTTER 1,797,792

DRIP MOLDING FOR VEHICLES

Filed Sept. 19, 1927

INVENTOR.
Albert T. Potter
BY
Francis D. Hardesty
ATTORNEY.

Patented Mar. 24, 1931

1,797,792

UNITED STATES PATENT OFFICE

ALBERT T. POTTER, OF DETROIT, MICHIGAN, ASSIGNOR, BY MESNE ASSIGNMENTS, TO AINSWORTH MANUFACTURING CORPORATION, OF DETROIT, MICHIGAN, A CORPORATION OF MICHIGAN

DRIP MOLDING FOR VEHICLES

Application filed September 19, 1927. Serial No. 220,344.

The present invention relates to drip moldings for vehicles particularly automobiles.

Among the objects of the invention is a molding which shall be made all of metal but which shall have effectively hidden the attaching means, such as nails or screws.

Another object is a molding of the type indicated which can be and preferably is made from sheet metal.

Other objects will readily occur to those skilled in the art upon reference to the following description and the accompanying drawing in which.

Figure 1:
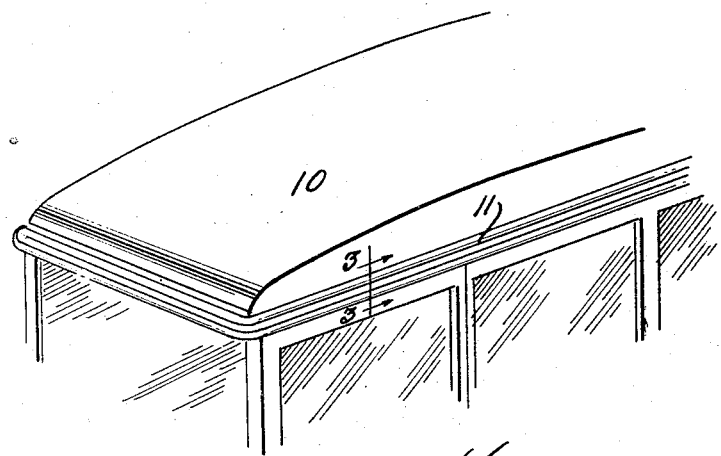
Figure 1 is a perspective view of an automobile top showing one use of the molding.
Figure 2:
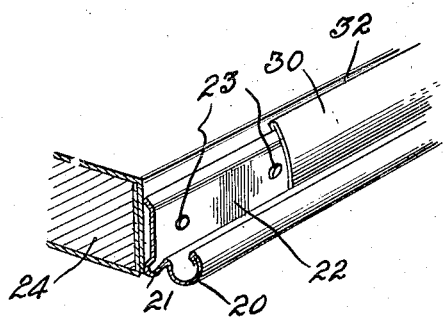
Figure 2 is a perspective view on a larger scale showing one form of the molding.
Figure 3:
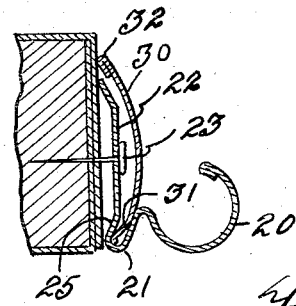
Figure 3 is a sectional view of the molding of Fig. 2, taken on line 3—3 of Figure 1.

As indicated in the drawing the molding is intended for use chiefly as a finishing strip and drip trough for the tops of automobiles, for securing and hiding the edges of the top covering material, and furnishing a trough for conveying water to one end of the top, thereby preventing the water from running down over the windows.

In the drawing a conventional automobile top is indicated at 10 with the molding 11 along the sides.

This molding in the preferred form comprises a strip of sheet metal folded longitudinally to form a main channel 20, a secondary channel 21, parallel with but much narrower than channel 20, and an upstanding nailing flange 22. The latter will be provided with perforations through which may be driven nails or screws 23 for securing the molding to the sill 24 or other suitable part of the top structure. The nailing flange 22 is preferably bent outwardly somewhat as shown so as to form a shoulder 25 near the bottom, and the bead between the channels is so formed that channel 21 tilts somewhat toward channel 20.

This member is secured in position by nails or screws 23 and a second curved member 30 is then inserted to cover the nail heads.

This member 30 is preferably a strip of thin sheet metal laterally curved and of such width as to extend from within channel 21 to above flange 22. Near its bottom edge it is curved somewhat more sharply as shown at 31 so that it contacts with both sides of channel 21 with its edge under shoulder 25. The main curvature should be such that with the lower edge in channel 21 as shown, the upper edge 32 is pressed tightly against the sill 24 or the fabric thereon. This upper edge 32 may be rolled under as shown to dull the edge and thereby lessen the danger of cutting the fabric.

Figure 4:
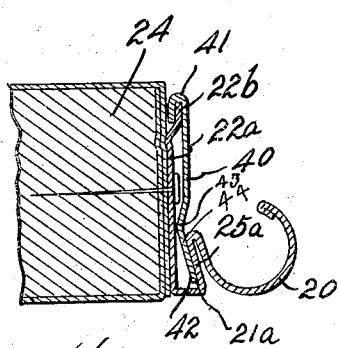
Figure 4 is a sectional view of a modified form.

In the modified form of the molding shown in Fig. 4, channels 20 and 21a are parallel as in the preferred form but channel 21a may be vertical with the nailing flange 22a substantially flat for most of its height but formed near its upper edge with an outwardly offset portion 22b.

The finishing strip for this form of molding is a narrow strip of metal 40 curving outwardly for most of its width and bent over at its upper edge as at 41 to hook over the part 22b of the first member. The lower edge 44 of strip 40 is turned outwardly as at 42 forming a shoulder or angle 43 that presses against the nailing flange while the lower edge 44 presses against the outer side 25a of channel 21a. This outer side 25a should be inclined inwardly so that it overhangs edge 44 when the strip is in position.

In either form of molding the finishing strip may be inserted either by sliding it into place longitudinally or by pressing it into position vertically. The latter is of course desirable on curved portions.

It will be noted that, in both forms of molding, the finishing strip is held in place against vertical displacement by means acting in conjunction with its lower edge.

Now having described the invention and the preferred form of embodiment thereof it is to be understood that the said invention is to be limited, not to the specific details herein set forth but only by the scope of the claim which follows.

I claim:

An all metal drip molding for attachment to a suitable supporting surface, comprising a drip channel, a nailing flange, and a narrow secondary channel therebetween, said latter channel having its walls inclined outwardly with its inner wall continued vertically to form the nailing flange, and a curved finishing strip adapted to extend from within said secondary channel to above the nailing flange, said strip having its lower edge curved more sharply to form a portion adapted to underlie said inclined inner wall and extend across said channel and rest against the outer wall thereof, the curvature of the main portion of such strip being such that the upper edge thereof presses tightly against the supporting surface.

ALBERT T. POTTER.